March 12, 1935.　　　　　　　　　　　　　　　　　　　1,994,258
C. J. SURDYKOWSKI, NOW BY JUDICIAL CHANGE
OF NAME C. J. SURDY ET AL
STOKER
Filed July 22, 1932

INVENTORS
Charles J. Surdykowski
Paul A. Ketchpel
BY
E. Archer Turner
ATTORNEY.

Patented Mar. 12, 1935

1,994,258

UNITED STATES PATENT OFFICE 1,994,258

STOKER

Charles J. Surdykowski, now by judicial change of name Charles J. Surdy, Tuckahoe, N. Y., and Paul A. Ketchpel, West Englewood, N. J., assignors to Standard Stoker Company, Inc., a corporation of Delaware Application July 22, 1932, Serial No. 623,984

10 Claims. (Cl. 198—15)

Our invention relates to locomotive stokers of the type in which a system of conduits and conveyors deliver fuel from the tender to the locomotive and raise it to a suitable elevation for scattering over the grates.

In stokers of this type, there is generally provided a conduit and screw conveying system for transferring fuel from the tender to the locomotive and a conduit and screw conveyor for elevating the transferred fuel to the firing opening in the fire box backwall. In the most usual form of the device, the transfer conveyor screw and the elevating screw are connected at their adjacent ends by a universal joint and are operated through gearing at the rear of the transfer conveyor screw. While devices of this form have been very satisfactory in actual practice, yet the gearing through which the conveyor screws are operated is not as accessible as it might be and the universal joint between the adjacent ends of the screw sections necessarily causes some abrasion of the fuel.

Another form of device eliminates the universal joint between the screw sections by having the adjacent ends of the screw sections in close proximity so that fuel passes directly from one screw section to the other, and operating the transfer screw section through gearing at its rearward end and the elevating screw through gearing or other suitable means at its lower end. Here again, gearing must be provided at the rear of the transfer screw section.

In another form of the device, illustrated by the patent to Stogdale 1,475,361, the gearing at the rear of the transfer screw section and the universal joint between the adjacent ends of the transfer screw section and the elevating screw have been eliminated by operating the transfer screw section through gearing at its forward end and the elevating screw through gearing at its lower end. It is to be noted, however, that in this form of the device, the adjacent ends of the transfer screw section and the elevating screw are comparatively widely separated to accommodate the gearing and a passage is provided through which fuel must be forced from the transfer screw section to the elevating screw.

It is the main object of this invention to provide a stoker of the type described above wherein the gearing at the rear of the transfer screw section and the universal joint between the adjacent ends of the transfer screw section and the elevating screw are eliminated and wherein the adjacent ends of the transfer screw section and the elevating screw are maintained in close proximity, so that fuel will pass directly from the one screw to the other eliminating tortuous or other passages through which fuel would have to be forced in passing from one screw to the other.

Another object of the invention resides in the particular arrangement and means for operating a stoker of the type described.

Other objects of the invention reside in the features of construction, the combination of elements and arrangement of parts hereinafter more fully described and claimed, and illustrated in the accompanying drawing, in which, Fig. 1 is a central vertical longitudinal section of a portion of the locomotive and tender with the invention applied thereto and shown in elevation with parts broken away;

Figure 3:
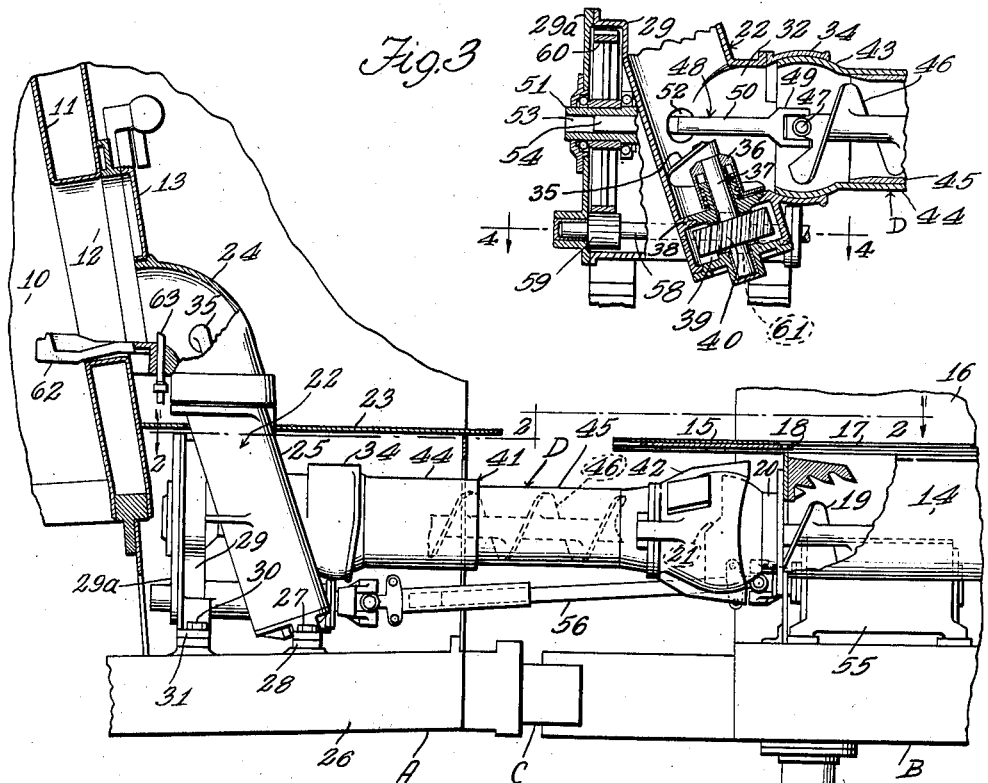
Fig. 3 is a sectional view taken on the irregular line 3—3 of Fig. 2.
Figure 1:
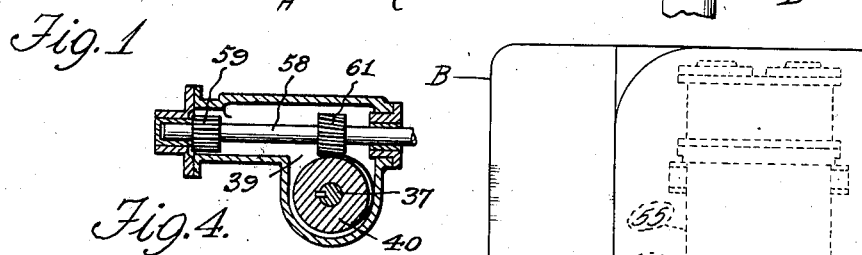
Figure 4:
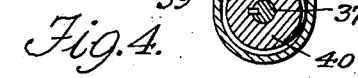
Fig. 4 is a sectional view taken on the line 4—4 of Fig. 3.
Figure 2:
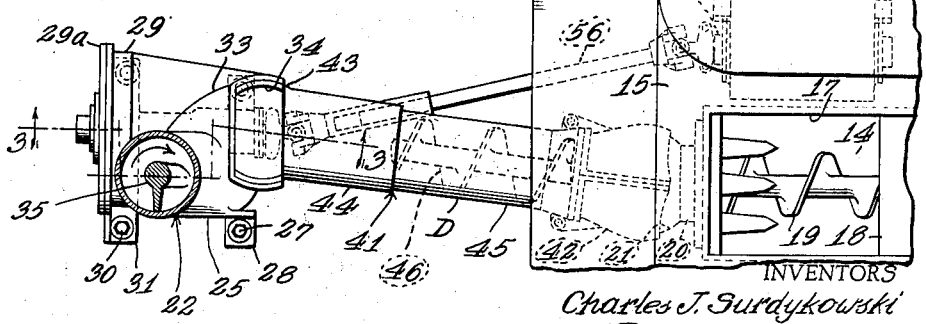
Fig. 2 is a sectional plan view taken on the line 2—2 of Fig. 1.

In the drawing, the locomotive is designated by the letter A, its tender by the letter B and the coupling member between the two by the letter C. The locomotive is provided with a firebox 10 having a backwall 11, the latter having an opening 12 therethrough for hand and mechanical delivery of fuel to the firebox. The upper portion of the firing opening 12 is closed by the firedoor 13, while the lower portion is arranged to receive the discharge end of a stoker, the latter being represented generally by the letter D.

The stoker D includes a trough member 14 fixedly mounted beneath the tender floor 15 and on the longitudinal center line of the tender B arranged to receive fuel from the bin 16 through an elongated opening 17 in the floor 15 of the tender, said elongated opening being controlled by the slidable plates 18. A screw conveyor 19 mounted in the trough 14 advances fuel therethrough. The forward end of the trough member 14 terminates in an extension 20 which includes a spherical shell 21.

A riser conduit 22 is preferably rigidly secured to the locomotive. It comprises a separable curved hood or mouth member 24, which at its forward end is rigidly secured to the backwall 11 in communication with the firing opening 12, and a straight tubular conduit 25 which is rigidly secured at its lower end to the locomotive frame 26 in any desired manner as by bolts 27 passing through the flanges 28 into the frame 26, said tubular conduit communicating at its upper end with the hood or mouth member 24. Preferably, as illustrated in the drawing, a gear housing 29 is formed as an integral part of the tubular conduit 25, and is provided with a removable cover 29a, though obviously if desired it may be formed as a separate element. To insure rigid attachment of the tubular conduit 25 and gear housing 29 to the locomotive, additional means as bolts 30 passing through the flanged members 31 into the frame 26 may be provided. The tubular conduit 25 is provided in the lower portion of its cylindrical wall with a laterally directed opening 32, bounding which opening is a short laterally and rearwardly curving tubular wall portion 33 having an open rearward end which is offset to one side of the longitudinal center line of the locomotive and carries a spherical split clamp 34.

The fuel is elevated in the riser conduit 22 by an elevating screw 35 equipped at its lower end with a sealing ring or dust guard 36 and a stub shaft 37, which latter projects through the bottom 38 of the riser conduit 22 into a gear housing 39, where it is equipped with a helical gear 40 through which it is driven. From an inspection of the drawing, it will be observed that the axes of the conveyor screws 19 and 35 are disposed on the longitudinal center line of the locomotive and tender, and may therefore be said to lie in a common plane.

An intermediate conduit 41 forming with the trough member 14 a transfer section for passing fuel from the tender to the locomotive, carries at its rearward end a vertically split clamp 42 arranged to receive the spherical shell 21 forming a flexible connection and carries at its forward end a spherical shell 43 arranged to be received in the spherical split clamp 34 forming a flexible connection. The axis of the intermediate conduit 41 preferably lies in the horizontal plane of the trough member 14 and comprises the telescopically related sections 44 and 45 to permit relative longitudinal movement between the locomotive and tender. A screw conveyor 46 is mounted in the intermediate conduit 41 and is universally connected at its rearward end with the forward end of the trough conveyor screw 19 and terminates at its forward end adjacent the spherical shell 43. The shaft of the screw conveyor 46 is provided at its forward end with one element 47 of a universal joint. A shaft 48 carries a complementary element 49 of a universal joint with which the element 47 forms a flexible connection. The shaft 48 comprises the telescopically related sections 50 and 51 and extends forwardly through an aperture 52 in the curving wall portion 33. The shaft section 51 is journalled in the gear housing 29 and cover 29a and is provided with a square opening 53 extending longitudinally therethrough. The shaft section 50 is provided at its forward end with a portion 54 that is square in transverse cross section and is longitudinally slidable in the opening 53 of the shaft section 51.

Power to drive the stoker is generated by a motor 55 preferably mounted at the forward end of the tender at one side of the trough 14. A longitudinally extensible shaft 56 is universally connected at one end to the crank shaft 57 and at its other end universally connected with a shaft 58. The shaft 58 extends into the gear housing 29 and carries a pinion 59 engaging the spur gear 60 which is mounted on the section 50 of the telescopic shaft 48 and a pinion 61 engaging the helical gear 40.

From the description thus far and the drawing it will be seen that the flights of the elevating screw 35 and the transfer screw 46 at their adjacent ends are in close proximity and the forward end of the flight of transfer screw 46 is offset to one side of and slightly above the lower end of the flight of the elevating screw 35. In conveying fuel through a conduit by means of a helicoid screw, it is discharged therefrom more to one side of a vertical plane passed through its longitudinal center line than the other. Thus, a screw that advances fuel when rotated in a clockwise direction has a tendency to deliver most of its charge to the left side of its center line. In the present construction, when the screw 46 is rotated in a clockwise direction, the fuel is discharged therefrom towards the elevating screw 35 and away from the shaft 48, thereby permitting unobstructed and free flow of fuel from one screw to the other, at the same time, permitting the two screws to be driven from their adjacent ends through gearing which is compactly and conveniently arranged beneath the locomotive cab deck adjacent the communicating ends of the riser and transfer conduits.

Elevating of fuel through a riser conduit is accomplished through cooperation of a screw and the close fitting walls of the conduit enclosing the screw. In the present construction, in order to bring the fuel discharged by the transfer screw 46 to the point where the riser screw 35 and the walls of the riser conduit 22 are close fitting, in the shortest path, the flights and the direction of rotation of the riser conduit screw 35 are arranged so that the screw 35 will sweep the fuel delivered by the transfer screw 46 in a direction away from the transfer screw 46 and rearwardly of the hub of the riser conduit screw 35.

The fuel conveyed through the conduit organization may be scattered over the fire in any suitable manner. For purposes of illustration a distributor 62 is shown over which fuel is projected by a blast of pressure fluid issuing from a distributor head 63.

We claim:

1. In a stoker, the combination of a riser conduit, a fuel transfer conduit including an open mouth trough and a forward conduit section, said forward conduit section lying in approximately the same horizontal plane of said open mouth trough and having its forward end offset laterally from the lower end of said riser conduit and communicating therewith, a conveyor screw in said riser conduit and a conveyor screw in said transfer conduit, the axes of said conveyor screws lying in a common plane, and drive mechanism carried by said riser conduit for operating the conveyor screw in said riser conduit from its lower end and the conveyor screw in said transfer conduit from its forward end.

2. In a stoker, the combination of a riser conduit, a fuel transfer conduit including an open mouth trough and a forward conduit section, said forward conduit section lying in approximately the same horizontal plane of said open mouth trough and having its forward end offset laterally from the lower end of said riser conduit and communicating therewith, a conveyor screw in said riser conduit, a conveyor screw in the trough portion of said transfer conduit and a conveyor screw in the forward conduit section of said transfer conduit, the axes of said first and second named conveyor screws lying in a common plane and said second and third named conveyor screws being flexibly connected at their adjacent ends, and drive mechanism carried by said riser conduit for operating said first named screw from its lower end and said third named screw from its forward end.

3. In combination with a locomotive having a firebox and a backhead with a firing opening therein, a tender for said locomotive provided with a fuel bin, a stoker comprising a riser conduit mounted on the longitudinal center line of the locomotive and communicating at its upper end with said firing opening, a fuel transfer conduit extending forwardly from beneath said tender fuel bin to the locomotive, said transfer conduit including an open mouth trough on the longitudinal center line of the tender and a forward conduit section lying in approximately the same horizontal plane of said open mouth trough and having its forward end offset laterally from the lower end of said riser conduit and communicating therewith, a conveyor screw in each of said conduits, said conveyor screws having their adjacent ends in close proximity so that fuel will pass directly from one screw to the other, gearing and shafting carried by said riser conduit associated with said screws for operating them from their adjacent ends.

4. In combination with a locomotive having a firebox and a backhead with a firing opening therein, a tender for said locomotive provided with a fuel bin, a stoker comprising a riser conduit mounted on the longitudinal center line of the locomotive and communicating at its upper end with said firing opening, a fuel transfer conduit extending forwardly from beneath said tender fuel bin to the locomotive, said transfer conduit including an open mouth trough on the longitudinal center line of the tender and a forward conduit section lying in approximately the same horizontal plane of said open mouth trough and having its forward end offset laterally from the lower end of said riser conduit and communicating therewith, a conveyor screw in each of said conduits, said conveyor screws having their adjacent ends in close proximity so that fuel will pass directly from one screw to the other, the flights and direction of rotation of said transfer conveyor screw being arranged to deliver most of its charge in the direction of the longitudinal center line of the locomotive, gearing and shafting carried by said riser conduit associated with said screws for operating them from their adjacent ends.

5. In combination with a locomotive having a firebox and a backhead with a firing opening therein, a tender for said locomotive provided with a fuel bin, a stoker comprising a riser conduit mounted on the longitudinal center line of the locomotive and communicating at its upper end with said firing opening, a fuel transfer conduit extending forwardly from beneath said tender fuel bin to the locomotive, said transfer conduit including an open mouth trough on the longitudinal center line of the tender and a forward conduit section lying in approximately the same horizontal plane of said open mouth trough and having its forward end offset laterally from the lower end of said riser conduit and communicating therewith, a conveyor screw in each of said conduits, said conveyor screws having their adjacent ends in close proximity so that fuel will pass directly from one screw to the other, the flights and direction of rotation of said transfer conveyor screw being arranged to deliver most of its charge in the direction of the longitudinal center line of the locomotive, means at the base of said riser conduit for operating said riser conduit screw from its lower end in a direction to sweep the fuel delivered by said transfer conduit conveyor screw towards the longitudinal center line of the locomotive and rearwardly of the hub of said riser conduit screw, and means carried by said riser conduit and at the forward end of said transfer conduit for operating said transfer conduit conveyor screw from its forward end.

6. In combination with a locomotive having a firebox and a backhead with a firing opening therein, a tender for said locomotive provided with a fuel bin, a stoker comprising a riser conduit rigidly mounted on the locomotive on the longitudinal center line thereof and communicating at its upper end with said firing opening, a fuel transfer conduit extending forwardly from beneath said tender fuel bin to the locomotive, the rearward portion of said transfer conduit being disposed on the longitudinal center line of said tender and the forward end of said transfer conduit being offset laterally from the lower end of said riser conduit and communicating therewith, a curved wall portion connecting the communicating ends of said conduits, said transfer conduit comprising a trough section rigidly mounted on the tender and a telescopic conduit section flexibly connected at its rearward end with said trough section and flexibly connected at its forward end with said curved wall portion, a conveyor screw in said riser conduit and a conveyor screw in said transfer conduit, said screws having their adjacent ends in close proximity so that fuel will pass directly from one screw to the other, the screw in said riser conduit having an extended shaft portion projecting through the base of the riser conduit, the screw in said transfer conduit having an extended telescopic shaft projecting through said curved wall portion, gearing associated with said shaft portion and said telescopic shaft, and a prime mover for operating said conveyor screws through said gearing and said shafts.

7. In combination with a firebox having a firing opening in one of its walls, a riser conduit having its discharge mouth in substantial registry with said firing opening, a fuel transfer conduit having a rearward portion and a forward portion, said forward portion lying in approximately the same horizontal plane of said rearward portion, one end of said forward portion being offset laterally from the lower end of said riser conduit and communicating therewith, and the rearward portion of said fuel transfer conduit lying in the same vertical plane as the discharge mouth of said riser conduit, a conveyor screw in said fuel transfer conduit, a conveyor screw in said riser conduit, and drive mechanism carried by said riser conduit for operating the conveyor screw in said fuel transfer conduit from its forward end and the conveyor screw in said riser conduit from its lower end.

8. In combination with a locomotive having a firebox and a backhead with a firing opening therein, a tender for said locomotive provided with a fuel bin, a stoker comprising a riser conduit disposed on the longitudinal center line of the locomotive and communicating at its upper end with said firing opening, a fuel transfer conduit extending forwardly from said tender and including an open mouth trough portion disposed on the longitudinal center line of the tender to receive fuel from said bin, a conduit section extending between said riser conduit and the open mouth trough portion of said transfer conduit and lying in approximately the same horizontal plane of said open mouth trough portion, said conduit section at one end being connected to one adjacent conduit in end-to-end relation therewith, and having its opposite end offset laterally from the adjacent end of the other conduit, a conveyor screw in said riser conduit, a conveyor screw in said trough portion, the axes of said conveyor screws lying in the same vertical plane, and a conveyor screw in said conduit section.

9. In combination with a locomotive having a firebox and a backhead with a firing opening therein, a tender for said locomotive provided with a fuel bin, a stoker comprising a riser conduit disposed on the longitudinal center line of the locomotive and communicating at its upper end with said firing opening, a fuel transfer conduit extending forwardly from said tender and including an open mouth trough portion disposed on the longitudinal center line of the tender to receive fuel from said bin, a conduit section extending between said riser conduit and the open mouth trough portion of said transfer conduit and lying in approximately the same horizontal plane of said open mouth trough portion, said conduit section at one end being connected in end-to-end relation with the forward end of said trough portion, and having its opposite end offset laterally from the rearward end of said riser conduit, a conveyor screw in said riser conduit, a conveyor screw in said trough portion, the axes of said conveyor screws lying in the same vertical plane, and a conveyor screw in said conduit section flexibly jointed at one end to the conveyor screw in said trough portion.

10. The combination with a locomotive having a firebox with a firing opening therein and a tender for said locomotive provided with a fuel bin, of a stoker comprising a riser conduit on the locomotive disposed in communication with said firing opening and feeding fuel forwardly thereto, a trough-like conduit on said tender positioned in an approximately horizontal plane and extending lengthwise of the tender in communication with said fuel bin, and an intermediate conduit extending between said riser and trough conduits, said intermediate conduit lying in the aforesaid plane and at one end being movably connected to one adjacent conduit in end-to-end relation therewith and having its opposite end offset laterally from and movably associated with the adjacent end of the other conduit and to one side of the vertical medial plane of the trough conduit, and means in said conduits for conveying fuel therethrough.

CHARLES J. SURDYKOWSKI.
PAUL A. KETCHPEL.